UNITED STATES PATENT OFFICE 2,024,864

CHROMATABLE AZO DYESTUFFS AND THEIR PRODUCTION

Georges Kopp and Pierre Petitcolas, Rouen, France, assignors to Compagnie Nationale de Matieres Colorantes et Manufactures de Produits Chimiques du Nord Reunies, Etablissements Kuhlmann, Paris, France, a corporation of France No Drawing. Application February 7, 1934, Serial No. 710,111. In France April 19, 1933

7 Claims. (Cl. 260—87)

This invention relates to new azo dyestuffs and derivatives thereof.

According to this invention when amines corresponding to the following general formulæ:—

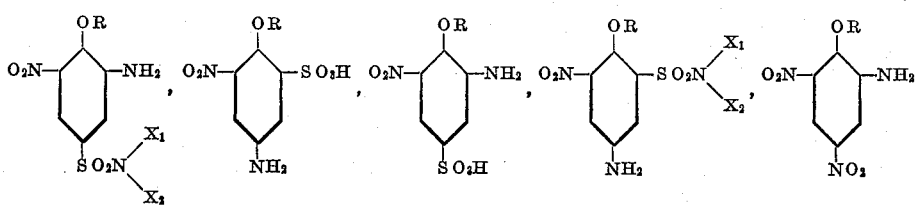

(R representing an alkyl radicle and $X_1$ and $X_2$ hydrogen atoms, aryl, alkyl or aralkyl radicles which may be substituted) are subjected to diazotization, diazo compounds are obtained which present the unexpected characteristic of being transformed very easily into hydroxydiazo compounds by dealkylation of the group OR.

The reactions of diazotization and dealkylation can be effected simultaneously or successively according to the products and according to the diazotization processes.

This facility of dealkylation appears to be due to the presence in ortho and para positions of electro-negative substituents pertaining to the group of radicles consisting of

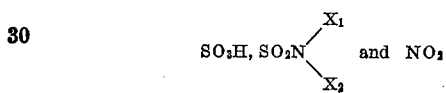

The new compounds obtained, in the form of the ortho hydroxy diazo compounds, give, by reaction with suitable coupling components, dyestuffs which are interesting on account of their faculty for forming metal compounds, either on the fibre or in substance. In this manner there can be obtained a complete range of new dyestuffs which can be chromed or treated with other metals. The coupling components which can be utilized for this purpose are very varied; it is possible to employ for example naphthols, phenols, naphthylamines, aminonaphthols, pyrazolones, betadiketones and so on, and in general all coupling components capable of combining with the diazo components set out above in a position ortho to their auxochrome grouping.

The dyestuffs thus produced lend themselves equally well to application in the form of dyestuffs capable of after chroming and to transformation from dyestuffs in substance into metal derivatives, the properties of these latter varying according to their organic composition, the process employed for treating with the metal and the selection of the metal oxides employed.

The dyeings and printings obtained by means of the new dyestuffs are distinguished quite generally by their great fastness to light.

The following examples illustrate the invention:—

Example 1

40.3 kgs. of 1-methoxy-2-amino-6-nitrobenzen-4(4'-sulphophenyl)-sulphonamide are dissolved in 500 litres of water and 15 kgs. of caustic soda of 35° Bé. 7 kgs. of sodium nitrite are added, the whole is cooled to 0° C. and 40 kgs. of hydrochloric acid of 19° Bé. are added all at once.

A white precipitate is obtained of normal diazo compound.

By heating to 40° C. for 20 minutes this product is converted into an intense yellow solution. This coloration is due to the formation of the ortho hydroxy diazo compound in the form of diazo oxide.

This solution is allowed to flow into a coupling bath containing 17.4 kgs. of 1-phenyl-3-methyl-5-pyrazolone dissolved in 500 litres of water and 14 kgs. of caustic soda of 35° Bé. to which 18 kgs. of anhydrous sodium carbonate have been added and which has been cooled to 0° C. The dyestuff thus formed is isolated by salting out and filtration.

It dyes wool scarlet which turns to strong orange by subsequent treatment with dichromate.

Example 2

45.3 kgs. of 1-ethoxy-2-amino-6-nitrobenzene-4-(4'-sulphonaphthyl)-sulphonamide, are pasted in 300 litres of water at 30° C., 30 kgs. of hydrochloric acid of 19° Bé. are added, the temperature is regulated to 30° C. and in one hour there is allowed to flow in a solution containing 7 kgs. of sodium nitrite dissolved in 25 litres of cold water. A solution of diazo oxide is obtained directly, the reactions of diazotization and dealkylation having taken place practically simultaneously.

This diazo solution is allowed to flow within 1 hour into a coupling bath containing 15 kgs. of β-naphthol, 14 kgs. of caustic soda of 35° Bé. and 24 kgs. of anhydrous sodium carbonate, the volume being regulated to 500 litres and the temperature to +10° C.

The azo dyestuffs precipitates in the form of reddish brown crystals with a golden reflection which are filtered and dried.

The dyestuffs dyes animal fibres in an acid bath a violet brown changing to pure violet, fast to light, by subsequent treatment with copper sulphate.

Example 3

The diazo solution obtained by the application of the process of diazotization of Example 2 to 41.7 kgs. of 1-methoxy-2-nitro-6-amino-benzene-4-(2'-methyl-4'-sulphophenyl)-sulphonamide is caused to flow into a solution containing 14 kgs. of pure meta-toluylene diamine and 24 kgs. of sodium carbonate in 500 litres of water at +5° C. The dyestuff commences to precipitate from its formation. It is isolated by heating, salting out and filtration. It gives on animal fibres by chromium printing vivid strong browns.

Example 4

60.8 kgs. of the dyestuff of Example 2 are heated under reflux with 28 kgs. of crystallized sodium acetate, 50 kgs. of chrome alum and 500 litres of water until the whole dyestuff has entered into solution in the form of the chromium compound. 150 kgs. of common salt are added and the product is filtered and dried. After grinding, the new dyestuff is produced in the form of a black powder very soluble in water.

This dyestuff dyes leather, wool, and other animal fibres, in black of excellent fastness. It has the advantage of dyeing natural silk whether weighted or not, in pure black in very good yields, both in a neutral and in an acid bath.

Example 5

58.8 kgs. of the dyestuff of Example 1 are heated in an enamelled autoclave for 6 hours at 140° C. with 500 litres of water, 75 litres of chromium sulphate solution containing 10% of $Cr_2O_3$ and 10 litres of sulphuric acid containing 10% of $H_2SO_4$. The dyestuff thus obtained is solubilized by conversion into an alkali metal salt.

The dyestuff dyes wool in orange fast to light.

Example 6

20 kgs. of the dyestuff obtained according to Example 3 are dissolved in 200 litres of water, 10 kgs. of sodium formate are added and 20 kgs. of crystallized copper sulphate and the whole is heated to 80° C. for half an hour. The coppered dyestuff is isolated by any known process.

The new coloring material dyes animal fibres in brown shades of excellent fastness particularly to light.

It is also possible in accordance with the invention to prepare a large number of other products of which some are illustrated in the following table:

| Constitution | Acid dyeings on wool of the non-metallized dyestuff | | | Color of the compounds | | |
|---|---|---|---|---|---|---|
| | Initial shade | Treated with dichromate | Treated with copper sulphate | Treated according to— | | Coppered |
| | | | | Example 4 | Example 5 | |
| $O_2N$—⬡(OH)(HO_3S)(SO_2N(C_2H_5)(C_6H_5))—N=N—⬡(OH)(SO_3H)(NHOCCH_3) | Violet | Green-black. | Deep violet. | Green-black. | Grey-green. | Blue-violet. |
| $O_2N$—⬡(OH)(SO_2NHCH_3)—N=N—⬡(NHC_2H_5)(SO_3H) | Red | ---------- | Violet | ---------- | ---------- | Violet. |
| $O_2N$—⬡(OH)(SO_2NH—⬡—SO_3H)—N=N—CH(COCH_3)(COOC_2H_5) | Orange | Yellow-brown. | Deep yellow. | Yellow-orange. | Yellow | Yellow. |

| Constitution | Acid dyeings on wool of the non-metallized dyestuff | | | Color of the compounds | | |
|---|---|---|---|---|---|---|
| | Initial shade | Treated with dichromate | Treated with copper sulphate | Treated according to— | | Coppered |
| | | | | Example 4 | Example 5 | |
| [structure: O₂N–C₆H₃(OH)(SO₂NH–C₆H₃(CH₃)–SO₃H)–N=N–CH(COCH₃)(CONH–C₆H₄Cl)] | Yellow | Yellow-orange | Orange | Orange | Orange-yellow | Yellow. |
| [structure: O₂N–C₆H₃(OH)(SO₂NH–C₆H₃(CH₃)–CH₃)–N=N–C₆H₂(NH₂)(CH₃)(NH₂)] | Brown-red | Brown | Brown | Brown | Yellowish brown | Brown. |

What we claim is:—

1. Process for the manufacture of new azo-dyestuffs capable of being after-chromed consisting in diazotizing primary amines of the benzene series substituted in the ortho position to the amino group by any alkoxy group and in the positions ortho and para to the said alkoxy group by a radicle of the group consisting of nitro, sulphonamide and sulphonic acid, dealkylating the diazo compounds produced and coupling with coupling components capable of combining with the said diazo compounds in the ortho position to the auxochrome groups of the coupling components.

2. Process for the manufacture of new azo-dyestuffs capable of being after-chromed consisting in diazotizing primary amines of the benzene series substituted in the ortho position to the amino group by any alkoxy group and in the positions ortho and para to the said alkoxy group by a radicle of the group consisting of nitro, sulphonamide and sulphonic acid and simultaneously dealkylating the diazo compounds produced and then coupling with coupling components capable of combining with the said diazo componds in the ortho position to the auxochrome groups of the coupling components.

3. Process for the manufacture of new azo-dyestuffs capable of being after-chromed consisting in diazotizing primary amines of the benzene series substituted in the ortho position to the amino group by any alkoxy group and in the positions ortho and para to the said alkoxy group by a radicle of the group consisting of nitro, sulphonamide and sulphonic acid, dealkylating the diazo compounds produced and coupling with coupling components of the group consisting of naphthols, phenols, naphthylamines, aminonaphthols, pyrazolones and betadiketones.

4. Process for the manufacture of new azo-dyestuffs capable of being after-chromed consisting in diazotizing a 1-alkoxy-2 amino-6-nitrobenzene substituted in the 4-position by a radicle of the group consisting of nitro, sulphonamide and sulphonic acid groups, dealkylating the diazo compound and coupling with a coupling component of the group consisting of naphthols, phenols, naphthylamines, aminonaphthols, pyrazolones and beta-diketones.

5. As a new product the monoazodyestuff corresponding to the formula:—

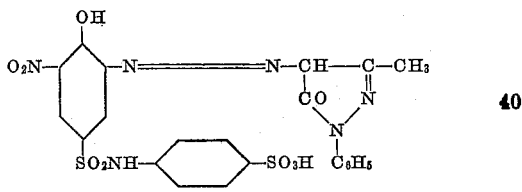

6. As a new product the monoazodyestuff corresponding to the formula:—

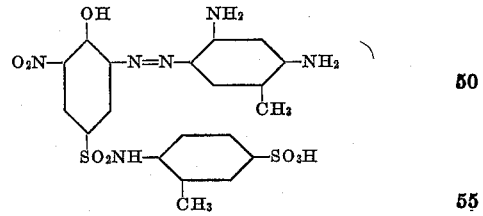

7. As a new product the monoazodyestuff corresponding to the formula

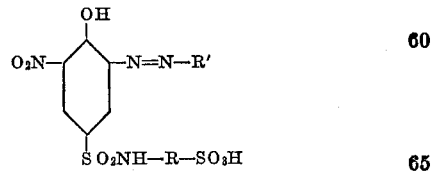

wherein R is an aryl radicle and R' a radical of a coupling component capable of combining with a diazo compound in the ortho-position of the auxochrome group of the coupling component.

GEORGES KOPP.
PIERRE PETITCOLAS.